(12) United States Patent
Sato et al.

(10) Patent No.: US 9,048,781 B2
(45) Date of Patent: Jun. 2, 2015

(54) ABNORMALITY DIAGNOSIS DEVICE, METHOD THEREFOR, AND COMPUTER-READABLE MEDIUM

(75) Inventors: Makoto Sato, Yokohama (JP); Yoshiaki Hasegawa, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 638 days.

(21) Appl. No.: 13/406,920

(22) Filed: Feb. 28, 2012

(65) Prior Publication Data
US 2012/0239322 A1 Sep. 20, 2012

(30) Foreign Application Priority Data

Mar. 17, 2011 (JP) .................................. 2011-059283

(51) Int. Cl.
*G06F 19/00* (2011.01)
*H02S 50/10* (2014.01)

(52) U.S. Cl.
CPC ....................................... *H02S 50/10* (2014.12)

(58) Field of Classification Search
None
See application file for complete search history.

(56) References Cited

U.S. PATENT DOCUMENTS

| 5,669,987 | A | 9/1997 | Takehara et al. |
| 6,717,519 | B2 | 4/2004 | Kobayashi et al. |
| 2002/0059035 | A1* | 5/2002 | Yagi et al. ........................ 702/59 |
| 2009/0000659 | A1* | 1/2009 | Hasegawa et al. ............ 136/252 |
| 2012/0062265 | A1 | 3/2012 | Chaintreuil et al. |

FOREIGN PATENT DOCUMENTS

| DE | 103 05 662 A1 | 9/2004 |
| EP | 2 019 433 A1 | 1/2009 |
| JP | 3896063 | 12/2006 |
| WO | WO 2010/118952 A1 | 10/2010 |
| WO | WO 2011/089999 A1 | 7/2011 |
| WO | WO 2011/104931 A1 | 9/2011 |

OTHER PUBLICATIONS

The Extended European search report issued Aug. 3, 2012, in Application No. 12157310.9-1524.
Dirk Stellbogen, "Use of PV Circuit Simulation for Fault Detection in PV Array Fields", Proceedings of the Photovoltaic Specialists Conference, vol. conf. 23, XP010113215, May 10, 1993, pp. 1302-1307.

* cited by examiner

*Primary Examiner* — John Breene
*Assistant Examiner* — Hien Vo
(74) *Attorney, Agent, or Firm* — Oblon, McClelland, Maier & Neustadt, L.L.P.

(57) ABSTRACT

There is provided an abnormality diagnosis device including: a storage storing power generation output data representing a current and a voltage of electrical power generated by each of the subsystems according to sampling time; a correcting unit configured to correct, for each of the subsystems, at least the current out of the current and the voltage in the power generation output data to a current corresponding to a standard insolation condition to generate corrected data including a corrected current and either one of a corrected voltage or the voltage in the power generation output data; a gradient estimating unit configured to produce, for each of the subsystems, an approximation graph of the corrected data and calculate a gradient of the approximation graph; and an abnormality diagnosing unit determining a subsystem for which the gradient satisfies a first threshold to be a subsystem including an abnormal module.

9 Claims, 25 Drawing Sheets

| Iph | 3.66 |
|---|---|
| Io | 2.00E-06 |
| α | 0.4 |
| Rs | 0 |

FIG. 8

| | 801 | | | | |
|---|---|---|---|---|---|
| S1 | 3.91 | 3.82 | 3.72 | 3.76 | 3.72 |
| S2 | 3.32 | 3.55 | 3.48 | 3.4 | 3.42 |
| S3 | 3.42 | 3.32 | 3.45 | 3.55 | 3.35 |
| S4 | 3.7 | 3.63 | 3.58 | 3.47 | 3.53 |

| | 802 | | | | |
|---|---|---|---|---|---|
| S1' | 1.91 ABNORMAL | 3.82 | 3.72 | 3.76 | 3.72 |
| S2 | 3.32 | 3.55 | 3.48 | 3.4 | 3.42 |
| S3 | 3.42 | 3.32 | 3.45 | 3.55 | 3.35 |
| S4 | 3.7 | 3.63 | 3.58 | 3.47 | 3.53 |

| time | S | V | I1 | I2 | I3 | I4 |
|---|---|---|---|---|---|---|
| 8:51 | 0.71 | 124 | 2.18 | 2.36 | 2.35 | 2.46 |
| 8:52 | 0.75 | 123 | 2.38 | 2.49 | 2.49 | 2.60 |
| 8:53 | 0.76 | 124 | 2.37 | 2.52 | 2.52 | 2.64 |
| 8:54 | 0.77 | 126 | 2.30 | 2.55 | 2.55 | 2.67 |
| 8:55 | 0.6 | 128 | 1.53 | 1.98 | 1.98 | 2.07 |
| 8:56 | 0.7 | 128 | 1.90 | 2.32 | 2.31 | 2.42 |
| 8:57 | 0.8 | 125 | 2.47 | 2.65 | 2.65 | 2.77 |
| 8:58 | 0.82 | 124 | 2.59 | 2.72 | 2.72 | 2.84 |
| 8:59 | 0.81 | 127 | 2.39 | 2.69 | 2.68 | 2.81 |
| 9:00 | 0.83 | 126 | 2.52 | 2.75 | 2.75 | 2.88 |

| time | V | S~ | 11' | 12' | 13' | 14' |
|---|---|---|---|---|---|---|
| 8:51 | 124 | 0.650 | 3.351 | 3.621 | 3.617 | 3.783 |
| 8:52 | 123 | 0.686 | 3.462 | 3.623 | 3.622 | 3.790 |
| 8:53 | 124 | 0.696 | 3.399 | 3.620 | 3.619 | 3.784 |
| 8:54 | 126 | 0.707 | 3.252 | 3.614 | 3.610 | 3.778 |
| 8:55 | 128 | 0.549 | 2.782 | 3.610 | 3.598 | 3.772 |
| 8:56 | 128 | 0.642 | 2.963 | 3.608 | 3.600 | 3.770 |
| 8:57 | 125 | 0.734 | 3.362 | 3.618 | 3.614 | 3.781 |
| 8:58 | 124 | 0.752 | 3.449 | 3.620 | 3.619 | 3.783 |
| 8:59 | 127 | 0.744 | 3.207 | 3.610 | 3.606 | 3.773 |
| 9:00 | 126 | 0.762 | 3.311 | 3.614 | 3.611 | 3.776 |

| time | Imax | I1_ratio | I2_ratio | I3_ratio | I4_ratio |
|---|---|---|---|---|---|
| 8:51 | 3.783 | -0.114 | -0.043 | -0.044 | 0.000 |
| 8:52 | 3.790 | -0.086 | -0.044 | -0.044 | 0.000 |
| 8:53 | 3.784 | -0.102 | -0.043 | -0.044 | 0.000 |
| 8:54 | 3.778 | -0.139 | -0.043 | -0.044 | 0.000 |
| 8:55 | 3.772 | -0.262 | -0.043 | -0.046 | 0.000 |
| 8:56 | 3.770 | -0.214 | -0.043 | -0.045 | 0.000 |
| 8:57 | 3.781 | -0.111 | -0.043 | -0.044 | 0.000 |
| 8:58 | 3.783 | -0.088 | -0.043 | -0.043 | 0.000 |
| 8:59 | 3.773 | -0.150 | -0.043 | -0.044 | 0.000 |
| 9:00 | 3.776 | -0.123 | -0.043 | -0.044 | 0.000 |

1702

| Idiff | -0.139 | -0.043 | -0.044 | 0.000 |
|---|---|---|---|---|

FIG. 17

| time | S | V | I | I1 | I2 | I3 | I4 |
|---|---|---|---|---|---|---|---|
| 8:54:21 | 0.78 | 126 | 10.21 | 2.33 | 2.59 | 2.58 | 2.70 |
| 8:54:22 | 0.77 | 127 | 10.00 | 2.24 | 2.55 | 2.55 | 2.67 |
| 8:54:23 | 0.73 | 126 | 9.51 | 2.15 | 2.42 | 2.42 | 2.53 |
| 8:54:24 | 0.71 | 125 | 9.30 | 2.13 | 2.36 | 2.35 | 2.46 |
| 8:54:25 | 0.68 | 126 | 8.82 | 1.96 | 2.25 | 2.25 | 2.36 |
| 8:54:26 | 0.65 | 127 | 8.33 | 1.78 | 2.15 | 2.15 | 2.25 |
| 8:54:27 | 0.67 | 128 | 8.54 | 1.79 | 2.22 | 2.21 | 2.32 |
| 8:54:28 | 0.6 | 129 | 7.47 | 1.45 | 1.98 | 1.97 | 2.07 |
| 8:54:29 | 0.55 | 128 | 6.86 | 1.34 | 1.81 | 1.81 | 1.90 |
| 8:54:30 | 0.6 | 127 | 7.64 | 1.60 | 1.99 | 1.98 | 2.07 |

| time | S | V | I | I1 | I2 | I3 | I4 | P | ΔP | N | Save |
|---|---|---|---|---|---|---|---|---|---|---|---|
| 8:54:21 | 0.78 | 126 | 10.21 | 2.33 | 2.59 | 2.58 | 2.70 | 1286 | - | 0.0 | |
| 8:54:22 | 0.77 | 127 | 10.00 | 2.24 | 2.55 | 2.55 | 2.67 | 1271 | -16 | 1.0 | |
| 8:54:23 | 0.73 | 126 | 9.51 | 2.15 | 2.42 | 2.42 | 2.53 | 1199 | -72 | 2.0 | |
| 8:54:24 | 0.71 | 125 | 9.30 | 2.13 | 2.36 | 2.35 | 2.46 | 1162 | -37 | 3.0 | |
| 8:54:25 | 0.68 | 126 | 8.82 | 1.96 | 2.25 | 2.25 | 2.36 | 1111 | -51 | 4.0 | |
| 8:54:26 | 0.65 | 127 | 8.33 | 1.78 | 2.15 | 2.15 | 2.25 | 1058 | -53 | 5.0 | |
| 8:54:27 | 0.67 | 128 | 8.54 | 1.79 | 2.22 | 2.21 | 2.32 | 1093 | 34 | 4.0 | |
| 8:54:28 | 0.6 | 129 | 7.47 | 1.45 | 1.98 | 1.97 | 2.07 | 964 | -129 | 5.0 | |
| 8:54:29 | 0.55 | 128 | 6.86 | 1.34 | 1.81 | 1.81 | 1.90 | 878 | -86 | 6.0 | Yes |
| 8:54:30 | 0.6 | 127 | 7.64 | 1.60 | 1.99 | 1.98 | 2.07 | 970 | 92 | 0.0 | |

FIG. 24

| time | S | V | I1 | I2 | I3 | I4 |
|---|---|---|---|---|---|---|
| 8:51 | 0.71 | 124 | 2.18 | 2.36 | 2.35 | 2.46 |
| 8:52 | 0.75 | 123 | 2.38 | 2.49 | 2.49 | 2.60 |
| 8:53 | 0.76 | 124 | 2.37 | 2.52 | 2.52 | 2.64 |
| 8:54 | 0.77 | 126 | 2.30 | 2.55 | 2.55 | 2.67 |
| 8:54:29 | 0.55 | 128 | 1.34 | 1.81 | 1.81 | 1.90 |
| 8:55 | 0.6 | 128 | 1.53 | 1.98 | 1.98 | 2.07 |
| 8:56 | 0.7 | 128 | 1.90 | 2.32 | 2.31 | 2.42 |
| 8:57 | 0.8 | 125 | 2.47 | 2.65 | 2.65 | 2.77 |
| 8:58 | 0.82 | 124 | 2.59 | 2.72 | 2.72 | 2.84 |
| 8:59 | 0.81 | 127 | 2.39 | 2.69 | 2.68 | 2.81 |
| 9:00 | 0.83 | 126 | 2.52 | 2.75 | 2.75 | 2.88 |

FIG. 25

ABNORMALITY DIAGNOSIS DEVICE, METHOD THEREFOR, AND COMPUTER-READABLE MEDIUM

CROSS REFERENCE TO RELATED APPLICATIONS

This application is based upon and claims the benefit of priority from the prior Japanese Patent Application No. 2011-59283, filed on Mar. 17, 2011, the entire contents of which are incorporated herein by reference.

FIELD

Embodiments relate to an abnormality diagnosis device, a method therefore, and a computer-readable medium, and for example, relates to abnormality analysis on power generating modules of a photovoltaic power generation system in which multiple strings each being interconnection of the power generating modules are controlled to the same voltage by a power conditioner or the like according to Maximum Power Peak Tracking (MPPT) control.

BACKGROUND

In a photovoltaic power generation system from which high output is required, typically strings composed of a large number of series-connected modules are connected in parallel. For efficient power generation, Maximum Power Peak Tracking (MPPT) control has been increasingly applied by a power conditioner (PCS) or the like. Consider detecting a string with an abnormal module in the case where power generation output data is measured only in the string-basis.

A method has been proposed for detecting abnormal modules only from data on past output performance without the use of a special abnormality detection circuit or a solar radiation sensor. This method groups power generation systems beforehand according to similarity of geographic proximity and/or installation conditions, and compares the amounts of power generation within a group with each other to find a system with relatively low generation output as an abnormality.

It is conceivable to apply this existing technique to compare power generation output data for individual strings in a photovoltaic power generation system to detect a string including an abnormal module. The technique, however, is not intended for a photovoltaic power generation system with strings controlled at the same voltage by a power conditioner according to Maximum Power Peak Tracking (MPPT), and thus it can make an erroneous determination as a result of output power comparison.

When power generation output data is measured only in the string basis in a photovoltaic power generation system, it will be more difficult to identify a string including an abnormal module as the level of serialization increases. Also, when one PCS performs MPPT control on multiple arrays of parallel-connected strings, the difference in output power becomes smaller at a higher level of parallelism, leading to an error of abnormality determination.

BRIEF DESCRIPTION OF THE DRAWINGS

FIG. 8 shows an example of varying Iph value in a system configured as shown in FIG. 7;

FIG. 11 shows power generation output data for each string within a certain time range;

FIG. 14 shows estimated insolation at each time for the power generation output data of FIG. 1 and corrected current data together;

FIG. 17 shows exemplary calculation of maximum current ratio and its average;

FIG. 20 shows an example of power generation data in increments of one second with a sharp drop in insolation;

FIG. 24 represents exemplary control of data collection timing;

FIG. 25 shows addition of one record to power generation output data;

DETAILED DESCRIPTION

According to an embodiment, there is provided with an abnormality diagnosis device for a photovoltaic power generation system which controls power generation using a plurality of subsystems each including a plurality of power generation modules being interconnected.

The abnormality diagnosis device includes a power output data storage, an output data insolation-correcting unit, a gradient estimating unit, and an abnormality diagnosing unit.

The power output data storage stores power generation output data representing a current and a voltage of electrical power generated by each of the subsystems according to sampling time.

The output data insolation-correcting unit corrects, for each of the subsystems, at least the current out of the current and the voltage in the power generation output data to a current corresponding to a standard insolation condition using insolation intensity data to generate insolation-corrected power generation data including a corrected current and either one of a corrected voltage or the voltage in the power generation output data.

The gradient estimating unit produces, for each of the subsystems, an approximation graph of the insolation-corrected power generation data and calculates a gradient of the approximation graph.

The abnormality diagnosing unit determines a subsystem for which the gradient satisfies a first threshold to be a subsystem including an abnormal module.

Hereinafter, the embodiment will be described with the accompanying drawings.

Figure 1:
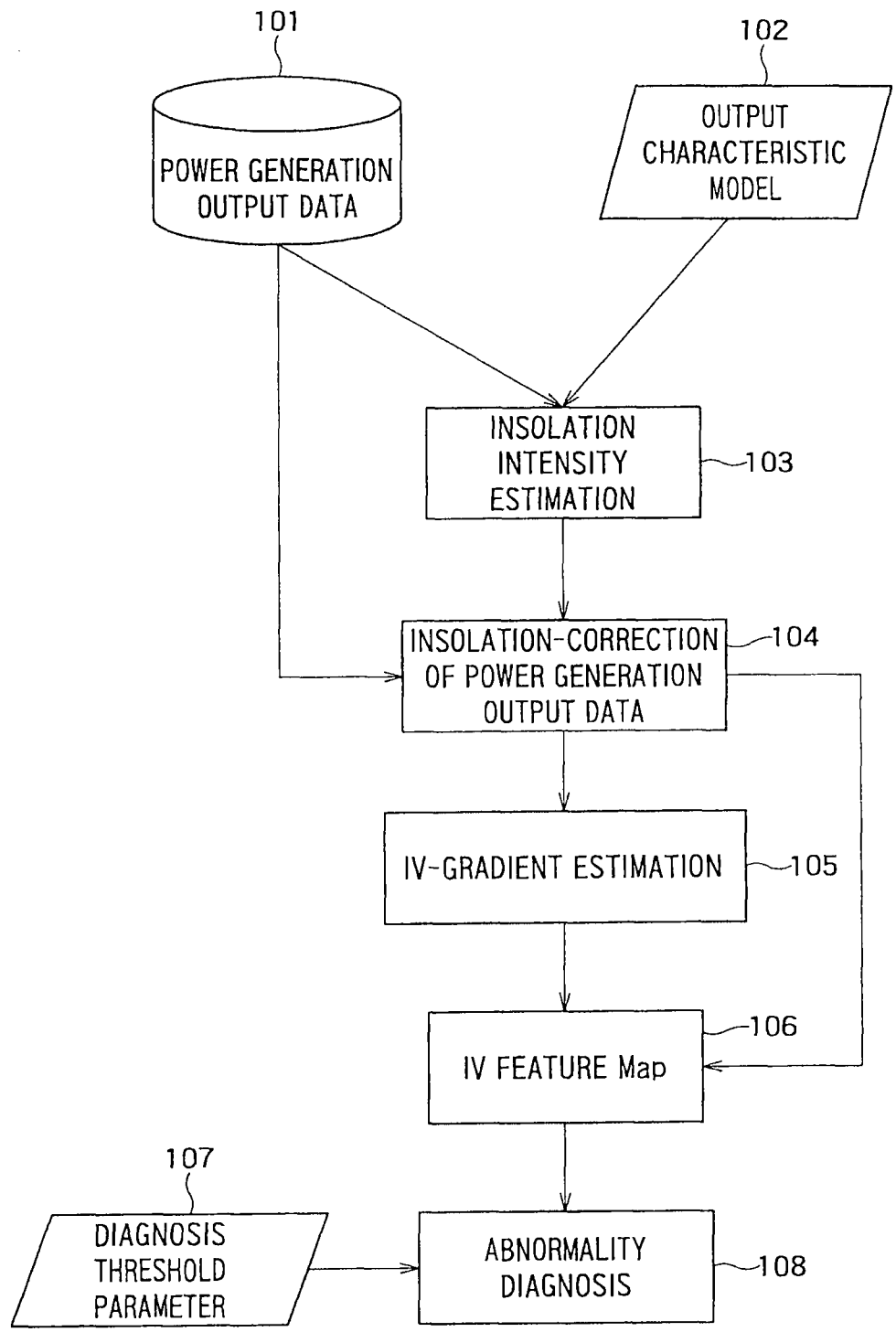
FIG. 1 is a block diagram showing an abnormality diagnosis device for a photovoltaic power generation system according to an embodiment.

FIG. 1 is a block diagram of an abnormality diagnosis device for a photovoltaic power generation system (a PV system) according to an embodiment. As shown in the figure, the abnormality diagnosis device includes a power output data storage 101, an output characteristic model storage 102, an insolation intensity estimating unit 103, an output data insolation-correcting unit 104, an IV gradient estimating unit 105, an IV feature map calculating unit (a feature calculating unit) 106, a diagnosis threshold parameter storage 107, and an abnormality diagnosing unit 108.

The functions of the abnormality diagnosis device shown in FIG. 1 can be realized as program modules of a remote control system using a computer server, for example. The program can be stored in a non-transitory computer readable medium.

Figure 2:
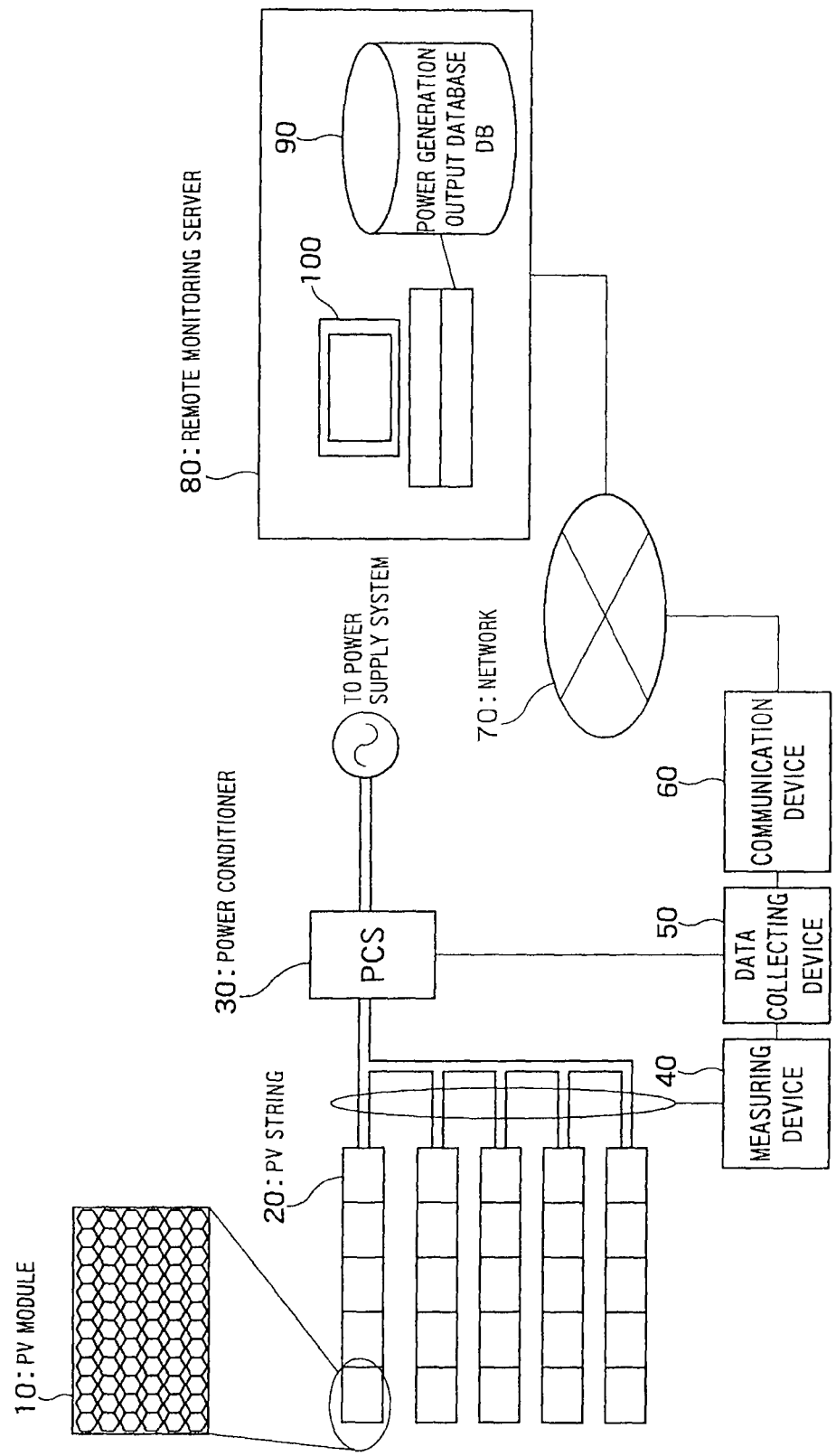
FIG. 2 shows an example of a remote abnormality monitoring system for the photovoltaic power generation system.

FIG. 2 shows an example of a remote abnormality monitoring system for the photovoltaic power generation system. In FIG. 2, a remote monitoring server 80 corresponds to the abnormality diagnosis device of FIG. 1. PV modules 10 are basic units of power generation, being connected in series to form a PV string (a subsystem) 20. Multiple PV strings are in turn connected in parallel and controlled by a power conditioner 30. The power conditioner 30 performs control called MPPT (Maximum Power Peak Tracking) in order to maximize power generation output. This control is applied varying the resistance and/or impedance of the power conditioner 30. The power conditioner 30 also has the function of converting DC voltage generated by the power generation into AC voltage and supplying the AC voltage to loads and an electricity distribution system, such as a smart grid.

Figure 26:
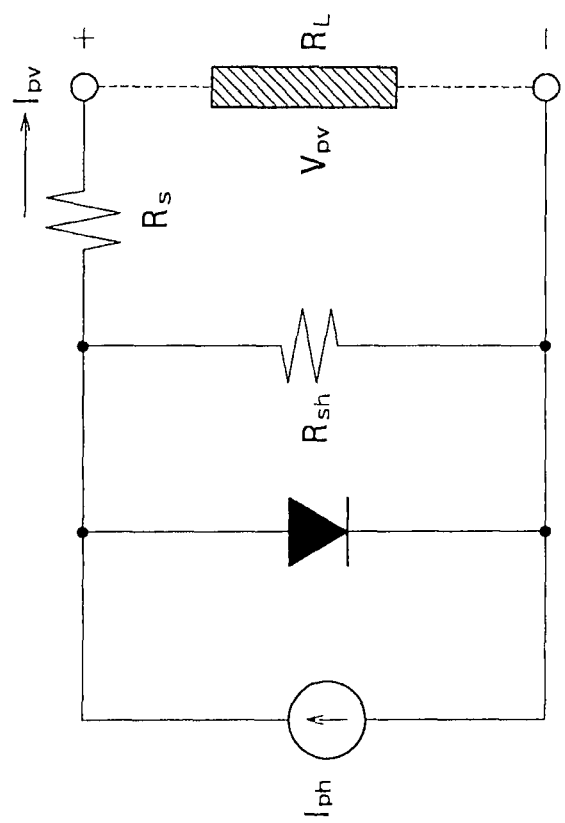
FIG. 26 shows an equivalent circuit for the photovoltaic power generation system.

A photovoltaic power generation system can be represented by such an equivalent circuit as shown in FIG. 26. "Iph" denotes the electromotive force of power generation, "$R_{sh}$" is shunt resistance (negligible), and "Rs" is series resistance. "$R_L$" represents resistance and/or impedance, and its adjustment causes a change in operating current Ipv and operating voltage Vpv. The power conditioner controls "$R_L$" so as to maximize Ipv*Vpv.

A measuring device 40 for measuring power generated in the power generation system is provided to sample the current and voltage of each PV string at certain time intervals. Sampling is controlled by a data collecting device 50. The data collecting device 50 can keep track of the internal state of the power conditioner 30 and also change timing of data collection and the like in accordance with the internal state.

Sampled current and voltage data is transferred to the remote monitoring server 80 over a network 70 by a communication device 60. The remote monitoring server 80 is constituted by a power output database 90 in which collected power generation output data is accumulated and a diagnosis computer 100 with abnormality diagnosis program modules installed therein. Diagnosis is conducted multiple times at certain time intervals and their results are displayed on a screen of the diagnosis computer 100.

Although only one power conditioner is shown in FIG. 2, data can be collected from many power conditioners in a large photovoltaic power generation system. Even in such a case, a single remote monitoring server can perform diagnosis of the entire system. In the following, the present photovoltaic power generation system will be described in detail by illustrating a relatively small system.

Power generation characteristics of a PV module are represented by IV characteristics defining current I and voltage V that can be generated by the module with a standard insolation intensity (e.g., 10 kJ/m$^2$). Formula 1 below defines the relationship between such I and V, where IV characteristics of one module are defined by parameters {Iph, Io, α, Rs}. In the formula, "S" represents insolation intensity, which is assumed to be 1.0 with a standard insolation intensity. "Rs" is series resistance of the power generation module, and "Io" is a characteristic parameter called reverse saturation current parameter, and "α" is a predetermined coefficient. With establishment of such parameters as shown at 401 in FIG. 4, for example, a module having certain output characteristics can be represented. Note that "2.00E-06" in the figure means $2.00 \times 10^{-6}$.

$$I = I_{ph}S - I_o[\exp\{\alpha(V + R_s I)\} - 1]  \quad \text{(Formula 1)}$$

Figures 4, 5:
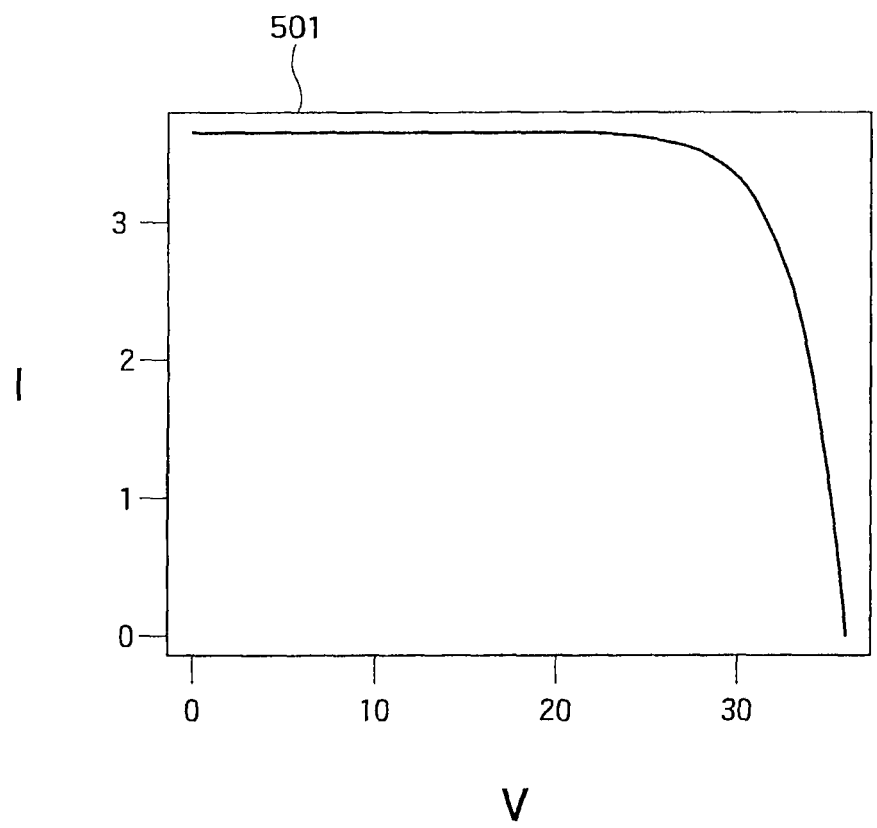
FIG. 4 shows exemplary parameters.
FIG. 5 shows an output characteristic model for standard insolation using the parameters of FIG. 4.
Figure 6:
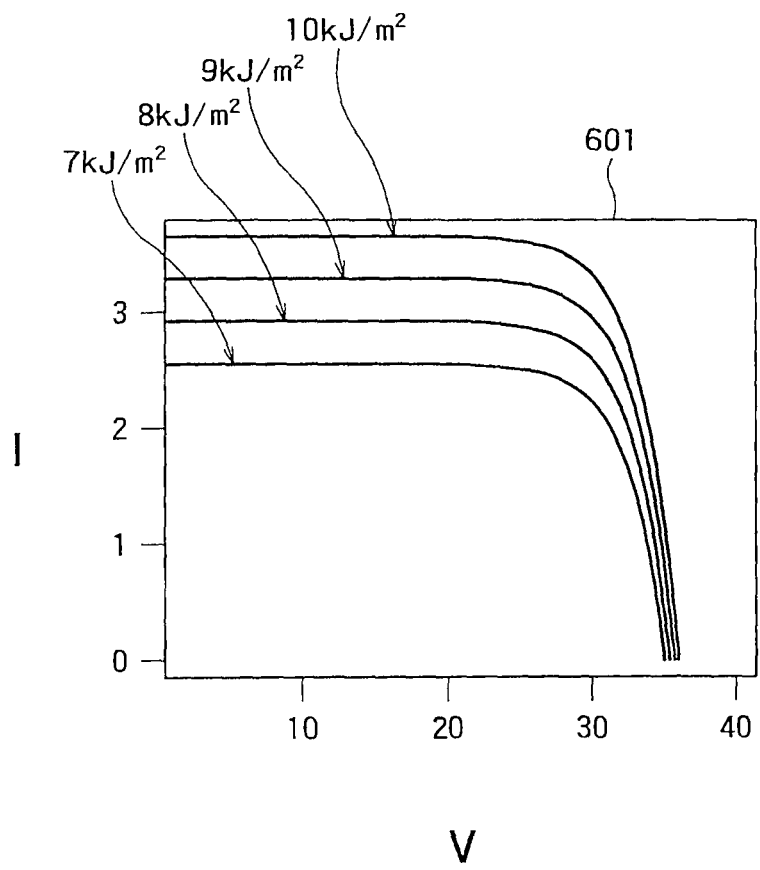
FIG. 6 shows IV characteristics for different insolation intensities.

Referring to FIG. 5, an output characteristic model for a standard insolation with the parameters of FIG. 4 is shown, where the x-axis represents voltage and the y-axis represents current. From FIG. 5, it can be seen that the amount of current that can be output steeply drops around 30 V. While FIG. 5 shows IV characteristics with a standard insolation, FIG. 6 shows IV characteristics for different insolation intensities. From FIG. 6, it can be seen that characteristics significantly degrade in current direction and also slightly degrade in voltage direction as insolation reduces. Since insolation significantly varies during actual power generation, data for various insolation intensities will be accumulated in the power output database.

Figure 7:
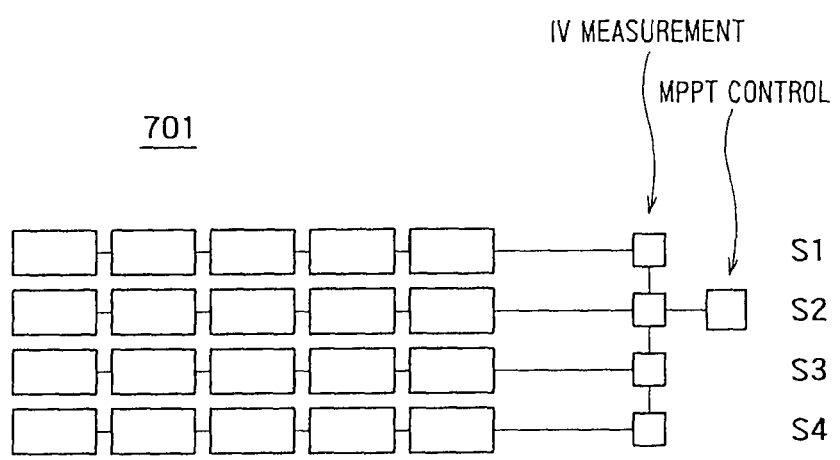
FIG. 7 shows an example of a power generation system.

FIG. 7 shows an example of a power generation system 701 in which four strings each Including five series-connected power generation modules are connected in parallel. Assume that measuring devices for measuring current and voltage of the respective strings (S1 to S4) in terms of strings are provided and a control device capable of MPPT-controlling the four strings simultaneously is connected in FIG. 7. Due to influence of variations in manufacturing quality or degree of degradation, the power generation ability of PV modules is not exactly the same.

FIG. 8 shows an example of variations of Iph value in the power generation system 701 shown in FIG. 7. In the example at 801, "3.91" in the first row of the first column indicates that the leftmost PV module in string S1 of the power generation system 701 has an "Iph" of 3.91. "Iph" corresponds to the current when V=0 and Rs=0 in IV characteristics, and corresponds to the current at the intersection of an IV characteristics curve with the y-axis in this embodiment. In the example at 802, this value has decreased from 3.91 to 1.91, meaning that current from one module decreases more than usual in PV string S1'.

Figure 9:
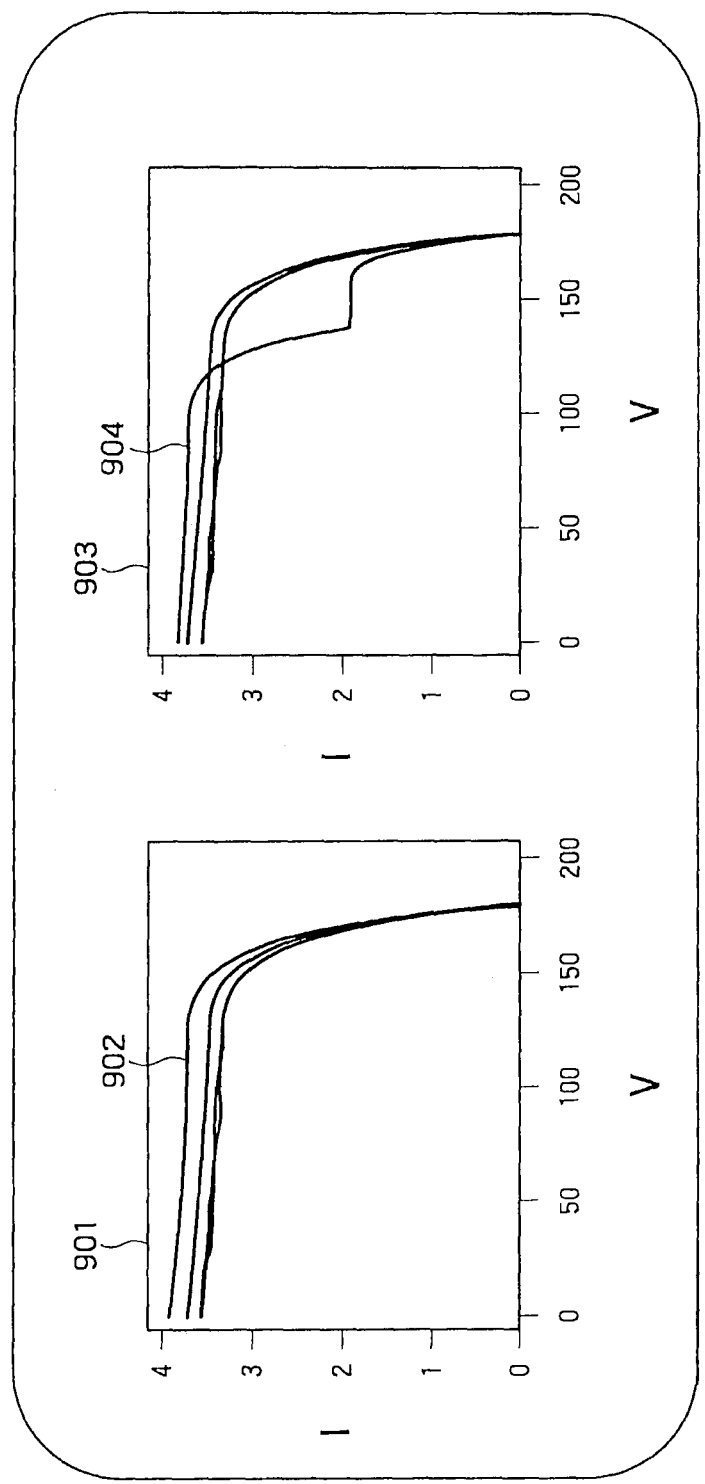
FIG. 9 shows a result of calculating string IV characteristics.

IV characteristics can be determined also for the PV strings of FIGS. 7 and 8 by determining IV characteristics of individual PV modules and adding up them in x-axis direction. A result of calculating string IV characteristics is shown in FIG. 9. Shown at 901 is IV characteristics of the PV strings shown at 801 in FIG. 8, where 902 corresponds to PV string S1. Shown at 903 is IV characteristics of the PV strings shown at 802 in FIG. 8, where 904 corresponds to PV string S1'. In the IV characteristics at 904, it can be seen that current significantly decreases from around 120 V. This is because the module with Iph=1.91 fails. However, when the PV system is operating at around V=100, for example, the current of PV string S1' does not decrease even in the example of 903.

The current and voltage at which the PV system operates are determined by the power conditioner 30. While power conditioners come in current control type and voltage control type, the following description considers a power conditioner of voltage control type. The power conditioner seeks an operating voltage that maximizes power generation. This is called MPPT control (Maximum Power Peak Tracking). Generated power is the product of current and voltage (P=I*V). Characteristics determined by summing currents having such IV-characteristics as shown at 901 in FIG. 9 per power conditioner and multiplying the sum by voltage are called P-V characteristics.

Figure 10:
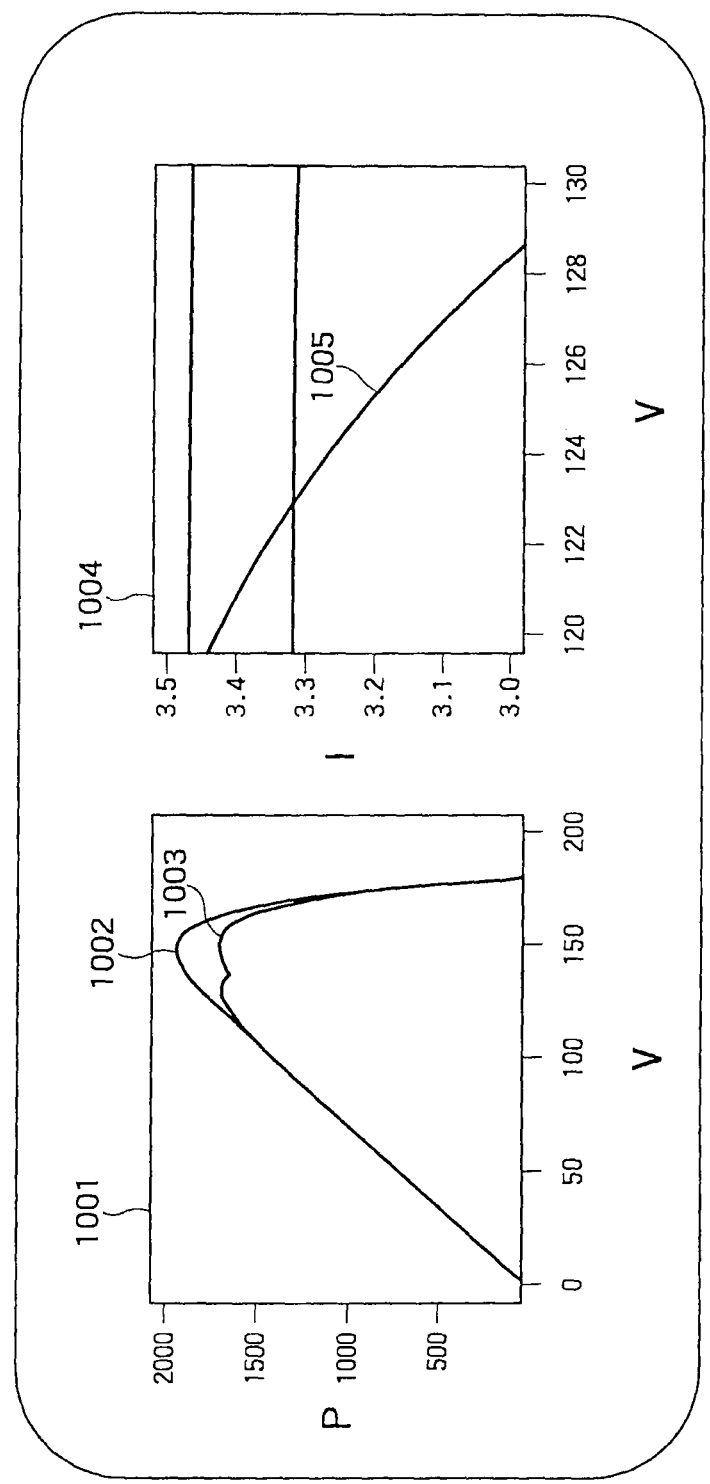
FIG. 10 is a graph of P-V characteristics.

In FIG. 10, 1001 represents a graph of P-V characteristics. In FIG. 10, shown at 1002 is P-V characteristics calculated from the IV characteristics shown at 901 in FIG. 9, and at 1003 is P-V characteristics calculated from the IV characteristics shown at 903 in FIG. 9. The peak of 1002 is around 145 V and that of 1003 is around 125 V. With a standard insolation, the power conditioner varies voltage so that the system operates at these peaks. Voltage can be varied such as by changing variable resistance of the power conditioner as mentioned above. In the case a conditioner of current control type, varying current instead of voltage is the only difference, and what is described hereinafter also applies to current control type.

An enlarged view of the IV characteristics shown at 903 in FIG. 9 around the peak at 1003 is shown at 1004. At 1005, an enlarged view of IV characteristics 904 of PV string S1' is shown. It can be seen that at operating voltages around 125 V, the difference between the current output by string S1', which is abnormal, and ones output by the other strings is not so large. On the other hand, there is a large difference in the gradient of IV characteristics between the abnormal string S1' and the other strings. Thus, consider detecting an abnormal string by estimating the gradient of IV characteristics. To that end, it is required to take change in insolation conditions into account.

In the block diagram 1, the power output data storage 101 stores output voltage and output current from individual strings.

Referring to FIG. 11, 1101 represents power generation output data for individual strings over a certain time range, where "I1" corresponds to output current of string S1 and so on. Although not required to be actually included, insolation intensity S is added in the data for reference. With a larger value of S, generated current as well as generated voltage increase in general.

Because the value of V is common to all strings, it requires only one field per power conditioner. With MPPT control, only values near the peak voltage are typically obtained.

Power generation output data may also include measurements with temperature sensors and solar radiation sensors for representative locations. Also, the interval of sampling time does not have to be one minute as in FIG. 11. Power generation output data 1101 in FIG. 11 represents data for a single abnormality diagnosis. Multiple sets of such data are accumulated, and overall determination can be made from the results of multiple abnormality diagnoses.

Figure 12:
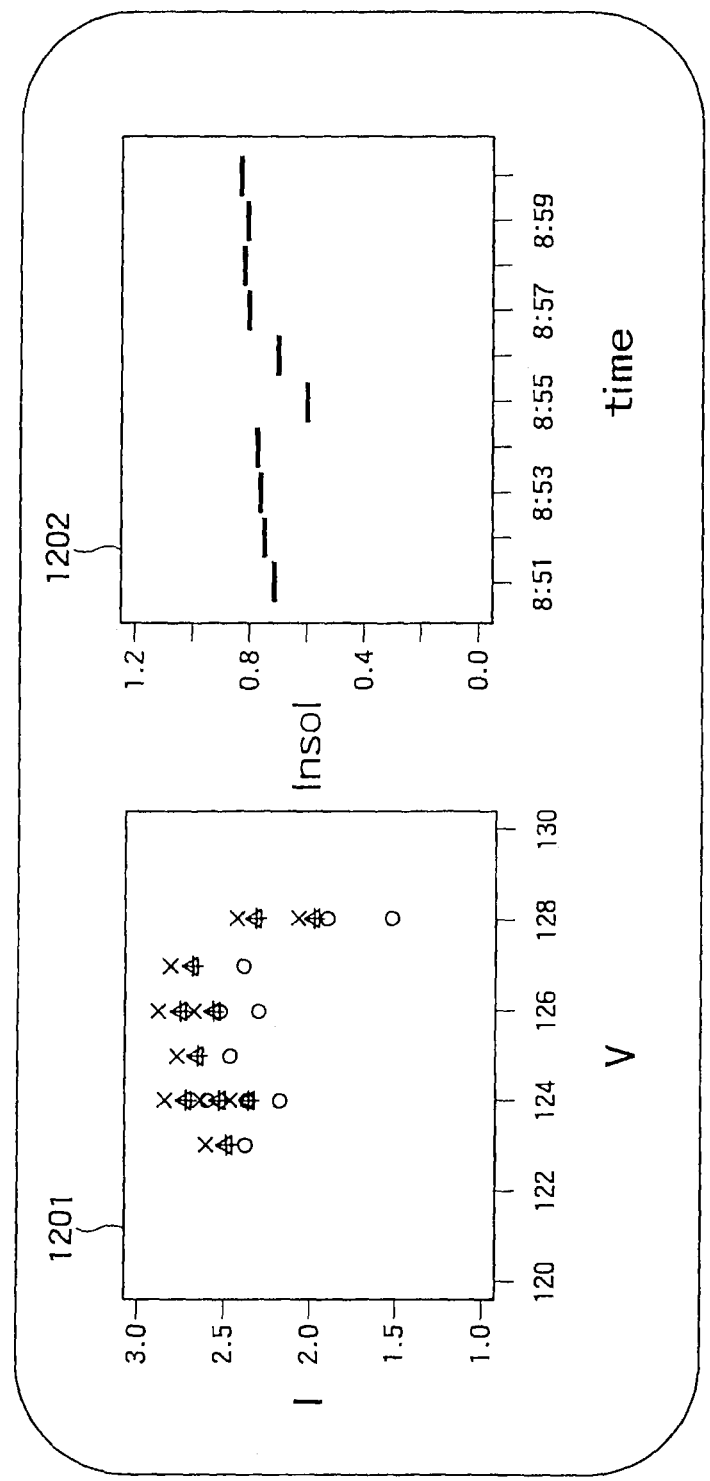
FIG. 12 shows plotting of current and voltage from the power generation output data of FIG. 11 in a two-dimensional space per string.

Shown at 1201 in FIG. 12 is a plot of current and voltage from the Power generation output data 1101 of FIG. 11 for the respective strings with the x-axis representing "V" and the y-axis representing "I", where legends are {S1: ○, S2: Δ, S3: +, S4: ×}. It can be seen that there is too much noise to estimate IV characteristics. This is due to variation in insolation.

At 1202 in FIG. 12, a plot of insolation intensity S from the power generation output data 1101 in FIG. 11 as time-series data is shown. Though there is a drop in insolation at 8:55, it is seen that insolation basically has an increasing trend. Thus, a feature of insolation intensity is that it has a global trend associated with change in the sun's position in the orbit and the trend is negatively affected by inhibiting factors such as cloud.

Estimation of IV characteristics for each string under varying insolation condition requires insolation correction. The present embodiment applies insolation correction based on insolation estimated with an output characteristic model.

The output characteristic model storage 102 stores information indicative of IV characteristics of a standard PV module, such as shown in FIG. 4. When PV modules of different specifications are used in the system, different output characteristic models are required for the respective modules. If temperature data or the like is available, an output characteristic model considering panel temperature may be used.

The insolation intensity estimating unit 103 estimates an approximate average insolation in each string within a certain time period of power generation output data.

Figure 13:
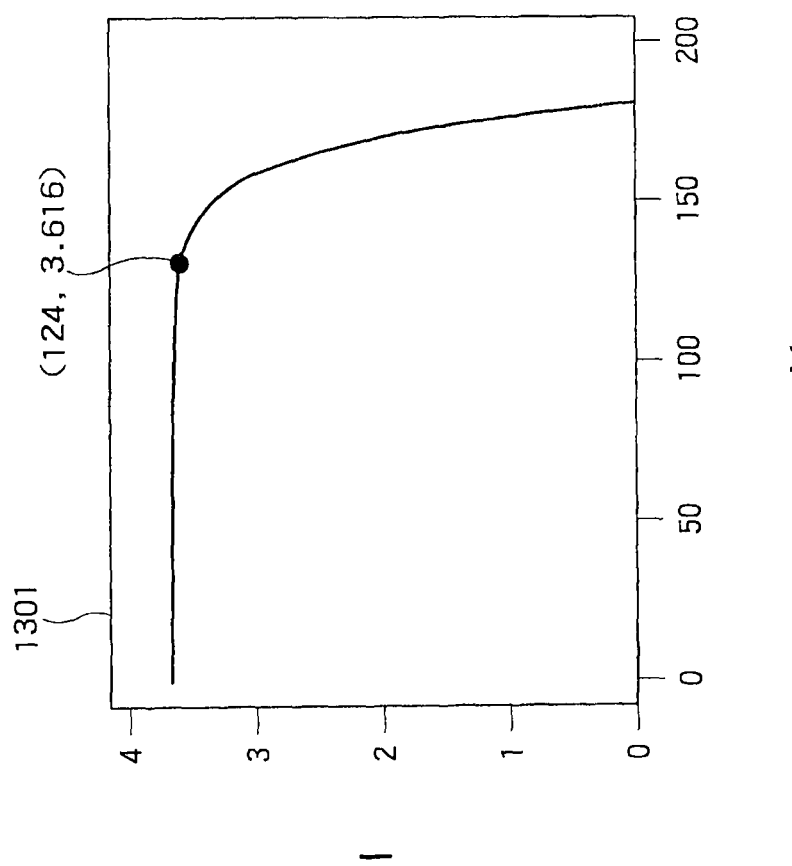
FIG. 13 shows IV characteristics for five output characteristic models of FIG. 4 connected in series.

First, IV characteristics of a PV string are determined using an output characteristic model. This can be done by considering a case where PV modules with the same level of performance are present as many as the number of serialization (i.e., five), as described in FIG. 9. FIG. 13 shows IV characteristics with five output characteristic models 401 of FIG. 4 connected in series. From FIG. 13, it can be seen that at V=124, for example, a current of 3.616 A should be output with a standard insolation.

Thus, insolation $S\hat{}(I1)$ estimated from the current I1 at time 8:51 in power generation output data 1101 of FIG. 11 is calculated as 2.18/3.616≈0.603. This is based on an approximation assuming that current and insolation intensity are in a proportional relationship with each other considering the fact that Formula 1 does not show much change in shape in V-direction even when the value of S is varied, as shown in FIG. 6. Insolation can also be estimated by least square method with substitution of values into Formula 1.

In the same way, calculations can be done:

$S\hat{}(I2)=2.36/3.616≈0.653$ $S\hat{}(I3)=2.35/3.616≈0.650$ $S\hat{}(I4)=2.36/3.616≈0.680.$ Then, estimated insolation SA can be determined through calculation: $S\hat{}=\mathrm{median}(S\hat{}(I1), S\hat{}(I2), S\hat{}(I3), S\hat{}(I4))≈0.65$.

"Median( )" is a function to calculate a median. Instead of median, average may be used, for example. In a large system, only strings that are geographically adjacent with each other may be used to determine the median or average. Such a median or average corresponds to a representative value of estimated insolation.

As a result of this calculation, the insolation at time 8:51 is estimated to be 0.65. Although this embodiment estimates insolation due to its assumption that insolation information is not available, values from solar radiation sensors may be used when data from solar radiation sensors or the like is also available.

Figure 15:
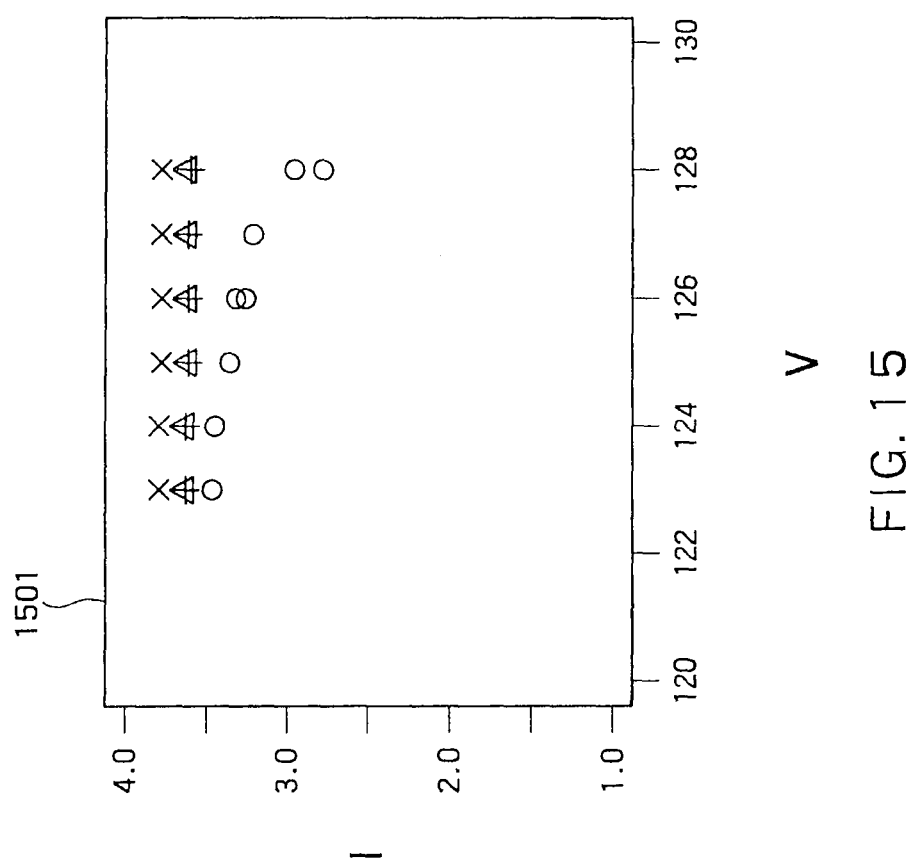
FIG. 15 shows plotting of data of FIG. 14 per string.

The output data insolation-correcting unit 104 uses insolation intensity data to correct the current in the power generation output data to a value corresponding to a standard Insolation. This can be done by dividing current by insolation, for example. That is, for the time 8:51, correction can be made such that corrected current I1'=2.18/0.65≈3.35. This value means it is estimated that string S1 would have output a current of about 3.35 A at 8:51 with a standard insolation. FIG. 14 shows at 1401 estimated insolation at different times in the power generation output data 1101 of FIG. 1 and corrected current data together. FIG. 15 shows at 1501 a plot of the data 1401 of FIG. 14 per string with the x-axis representing "V" and the y-axis representing "I", using the same legends as in FIG. 12. It can be understood that insolation correction facilitates estimation of IV characteristics.

Figure 27:
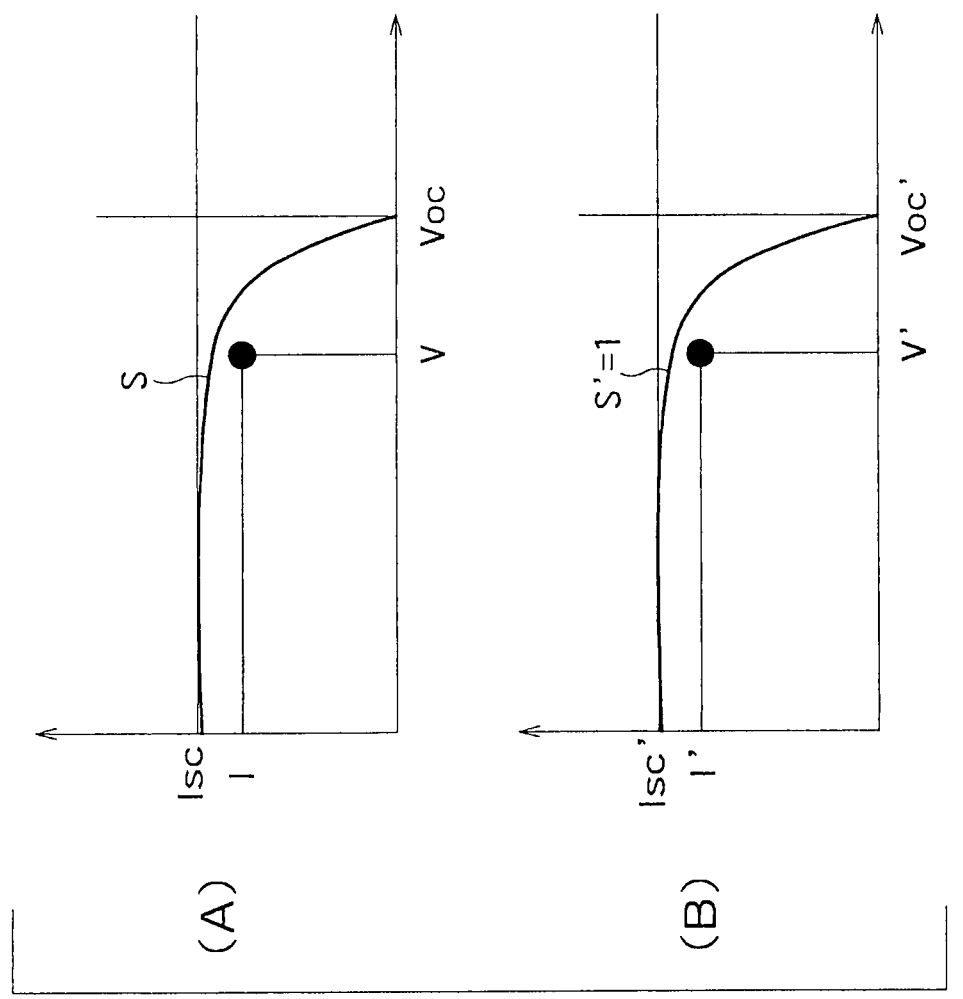
FIG. 27 illustrates how to correct both current and voltage.

Although this example does not correct voltage because the curve shape does not change much in V-direction even when the value of S is varied, voltage may be corrected to a value corresponding to standard insolation in addition to current. In this case, the method shown below can be employed, for example. FIG. 27 is a diagram for illustrating the method, representing voltage at the intersection of the IV curve with the x-axis as "Voc" and current at the intersection with the y-axis as "Isc". To correct (S,I,V) to (S'=1,I',V'), calculation of I'=I*Isc'/Isc, V'=V*Voc'/Voc should be done using the IV curve for uncorrected insolation (FIG. 27(A)) and the IV curve for a standard insolation (FIG. 27(B)).

Figure 16:
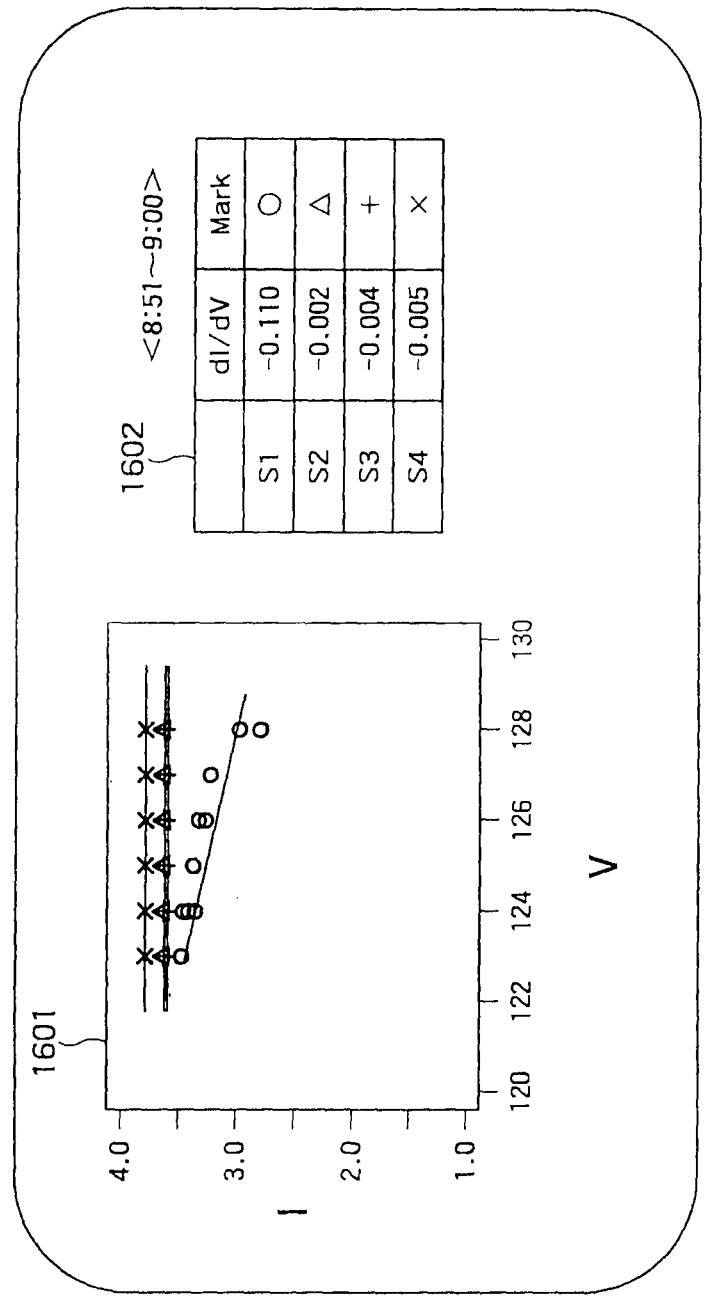
FIG. 16 represents an example of gradient estimation.

The IV gradient estimating unit 105 uses corrected power generation output data to calculate an IV characteristics graph and its gradient. Here, it uses data over the certain time range mentioned above for calculation. FIG. 16 shows exemplary estimation of gradient, which calculates an approximation graph (an IV characteristics graph) for the plot 1501 of FIG. 15 and its gradient. The result of gradient calculation is shown in Table 1602. For calculation of an approximation graph and its gradient, a linear regression may be applied. Since IV characteristics have a non-linear shape around the peak, however, it may be desirable to use only data with V larger than the power peak. Thus, only data with V larger than the median may be used for calculation of gradient, for example. When the amount of available data is small, it is also effective to use some values smaller than the median. Instead of linear regression, non-linear regression methods such as regression with a quadratic curve or neural network may also be used.

The IV feature map calculating unit 106 calculates a feature of an estimated IV characteristic graph (an IV feature). Though the gradient can be considered as a feature of an IV characteristics graph, at least one IV feature other than gradient is calculated in this unit. The IV feature map calculating unit 106 then plots the IV feature calculated and gradient data (dI/dV) in a two- or higher-dimensional space (a feature space) to yield an IV feature map.

As an example of an IV feature, an example of calculating the average ratio ("Idiff") with respect to the maximum current at each time is shown here. "Idiff" (maximum current ratio) serves as an index for identifying a string with the largest current and judging how much current falls short of that current. FIG. 17 shows exemplary calculation of the maximum current ratio and its average. Maximum current "Imax" is calculated at each time and the current ratio at that time is determined with the equation: I1_ratio=(I1'-Imax)/Imax. Finally, such ratios are averaged over all times to determine an IV feature.

Figure 18:
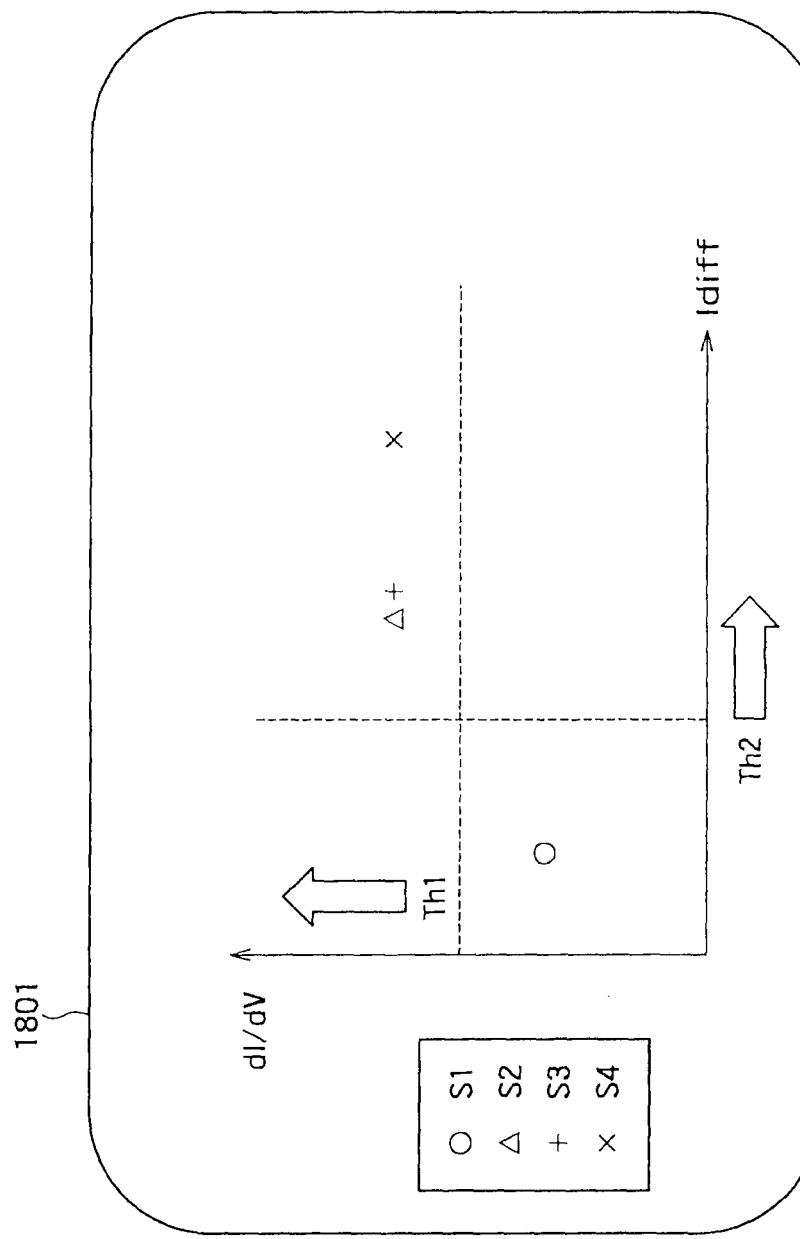
FIG. 18 is a plot of power generation result of strings in a feature space constituted by "Idiff" and "dI/dV"

FIG. 18 shows an IV feature map that plots results of power generation by individual strings using the values of FIGS. 16 and 17 in a feature space constituted by "Idiff" and "dI/dV".

The abnormality diagnosing unit 108 determines whether each string is normal or abnormal using parameters Th1 (a first threshold) and Th2 (a second threshold) stored in the diagnosis threshold parameter storage 107. In the example of FIG. 18, a portion that satisfies a condition, dI/IV>Th1 and Idiff>Th2, is determined to be a normal area and other portions are abnormal areas.

Figure 19:
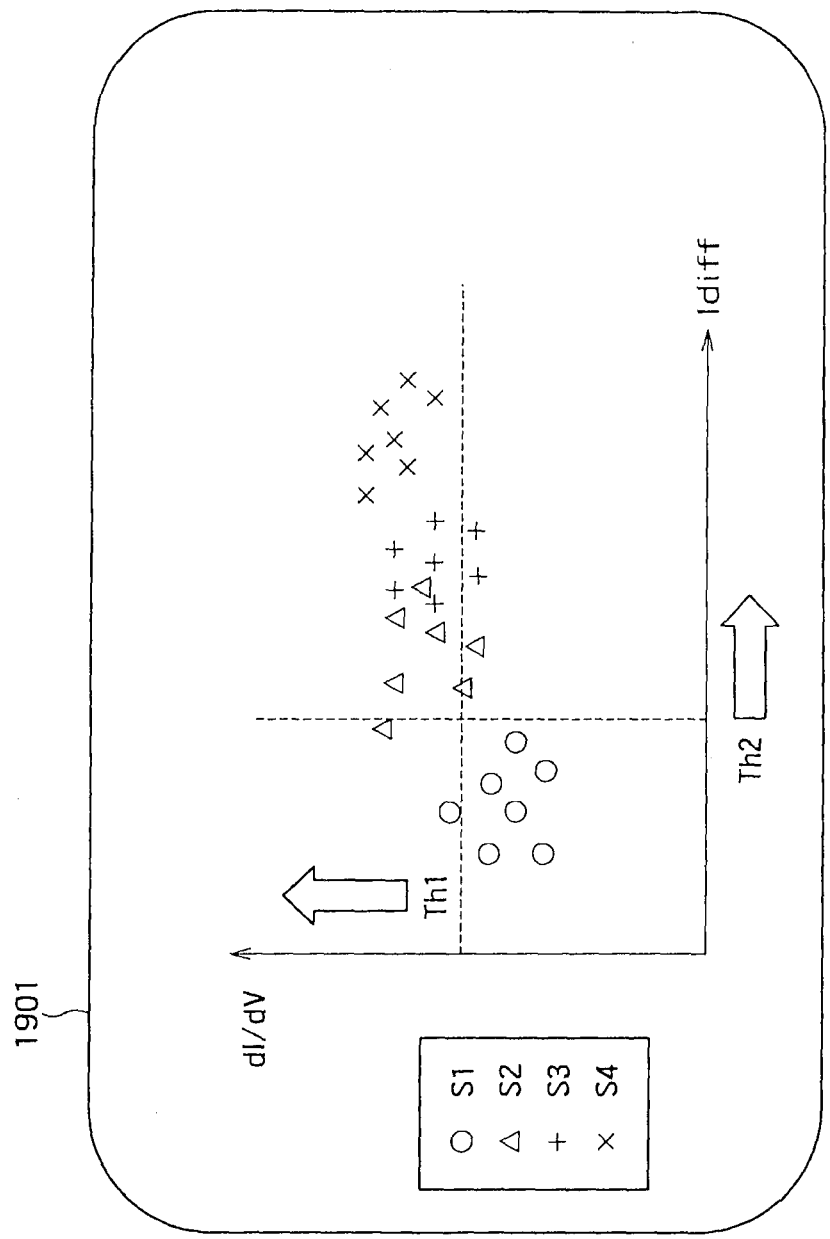
FIG. 19 shows an example of seven sets of data.

For diagnosis of an abnormality from more information, it is possible to use data corresponding to more times (a plurality of periods) to plot results on a map. FIG. 19 shows an example of calculating and plotting data on gradient and IV features from seven sets of data. In such a case, with further inclusion of a threshold parameter θ, probability-based determination can be carried out such that:

If Pr(dI/dV<Th1 or average Idiff<Th2)>θ→a string with an abnormal module

That is, if either the probability of dI/dV being smaller than Th1 or the probability of average Idiff (an IV feature) being smaller than Th2 is larger than θ, the string is determined to include an abnormal module. The probability means, for example, a ratio of the number of periods in which the above condition is satisfied, to the plurality of periods.

Although the example above calculates both dI/dV and an IV feature before thresholding with θ, an alternative method is possible as follows. First, only dI/dV is calculated and determination is maxde with threshold θ. Only when it is determined that the string is not abnormal, average "Idiff" is calculated and determination with threshold θ is made again. This can omit processing for calculating "Idiff" and its average when a string has been determined to be abnormal with dI/dV.

Although the example above uses maximum current for determining an IV feature, average current may be used instead. For example, a feature can be calculated by (I1'-Iave)/Iave, where "Iave" is average current.

These average and maximum currents correspond to representative current according to an embodiment. The representative current may also be a current other than average or maximum current.

The IV feature map does not have to be two-dimensional: it may be three- or higher-dimensional.

Also, dI/IV tends to decrease as PV modules age and degrade. Thus, if gradient −Δ (Y) that is caused by aging degradation after an operation year (Y) is known, aging degradation correction can be made such that dI'/dV=dI/IV+Δ (Y). Such correction allows the same diagnosis threshold parameters to be continuously used for abnormality diagnosis even if there is aging degradation of modules.

Figure 3:
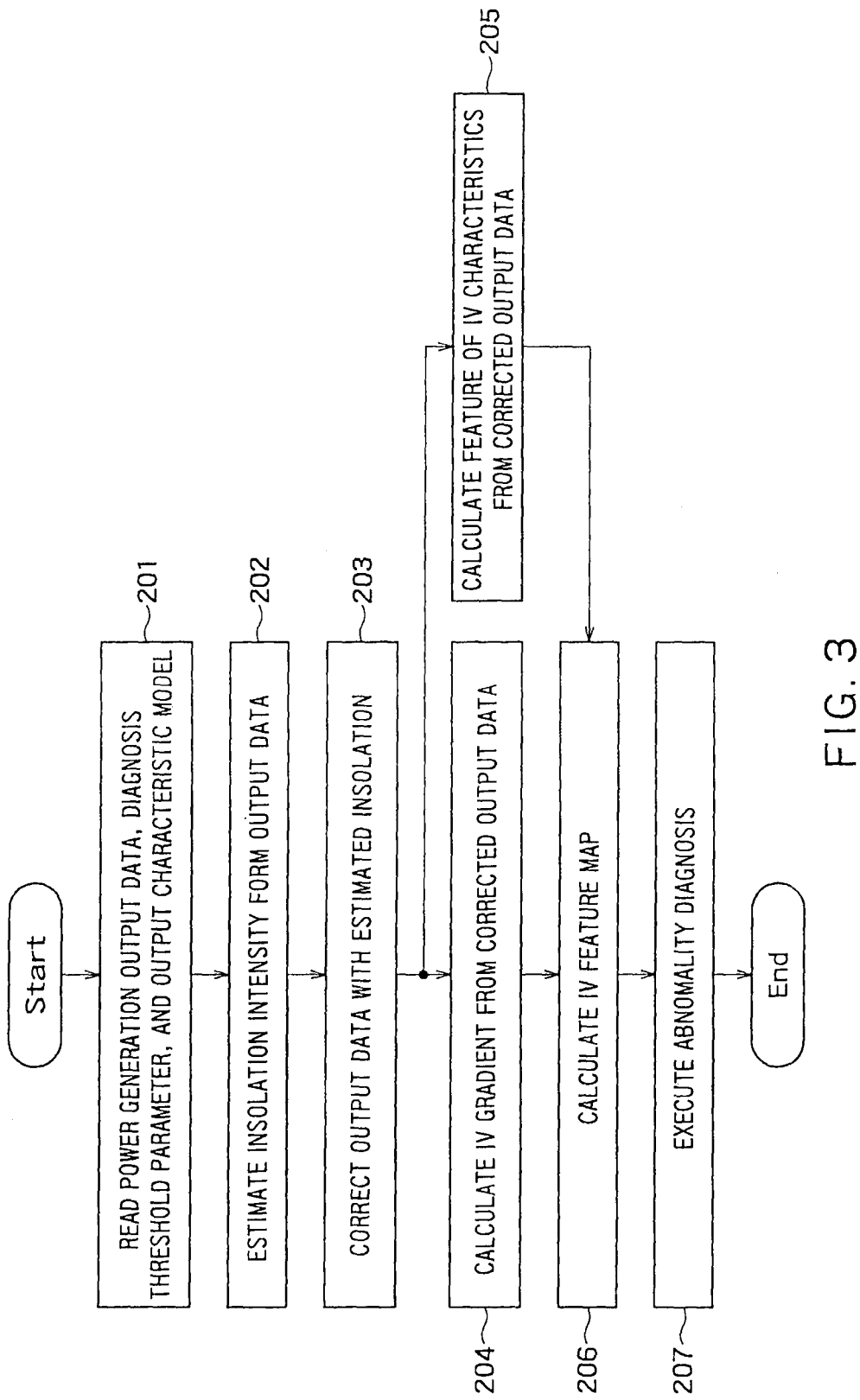
FIG. 3 is a flowchart showing the flow of operation by the abnormality diagnosis device of FIG. 1.

FIG. 3 is a flowchart showing an example of operation flow of the abnormality diagnosis device shown in FIG. 1.

The insolation intensity estimating unit 103 reads power generation output data from the power output data storage 101 and an output characteristic model from the output characteristic model storage 102 (201).

The abnormality diagnosing unit 108 reads diagnosis threshold parameters from the diagnosis threshold parameter storage 107 (201). The diagnosis threshold parameters may be read at a later stage as long as it is in time for abnormality diagnosis.

The insolation intensity estimating unit 103 estimates insolation intensity based on the read power generation output data and output characteristic model (203).

The output data insolation-correcting unit 104 corrects at least the current out of current and voltage in the power generation output data based on estimated insolation intensity (203). This yields insolation-corrected power generation data including a corrected current and either a corrected voltage or the voltage in the power generation output data.

The IV gradient estimating unit 105 calculates an approximation graph (an IV characteristics graph) for the insolation-corrected power generation data and determines the gradient (IV gradient) of the graph (204).

The IV feature map calculating unit 106 calculates a feature (other than gradient) of IV characteristics from the insolation-corrected power generation data (205), e.g., the average maximum current ratio described above.

The IV feature map calculating unit 106 maps the IV gradient and IV feature in a feature space constituted by IV gradient and feature to yield an IV feature map (206).

The abnormality diagnosing unit 108 performs determination on abnormality using the IV feature map, the first threshold, and the second threshold (207). For example, it determines that a string having an IV gradient satisfying the first threshold Th1 or a feature satisfying the second threshold Th2 is a string including an abnormal module. When multiple data sets are used, it determines a string that satisfies either a condition that the probability of satisfying the first threshold is greater than θ or a condition that the probability of satisfying the second threshold is greater than θ is a string including an abnormal module. The abnormality diagnosing unit 108 records the result of the determination of abnormality in an internal storage and also outputs it to outside (e.g., displays on the monitor screen).

The embodiment described so far is based on the assumption that power generation output data is sampled and collected at fixed intervals. Due to MPPT control, however, the power conditioner monitors current data (only the sum, I=I1+I2+I3+I4. Individual currents I1 to I4 are measured solely by a power generation measuring device) and voltage data at shorter time intervals. Thus, consider identifying a time suitable for use in abnormality diagnosis utilizing information observed by the power conditioner, and accumulating power generation data measured at the time as power generation output data. Realization of this would enable accurate abnormality diagnosis with less data.

Data suitable for use in IV-gradient-based abnormality diagnosis is data corresponding to operation at a voltage larger than the power peak. As shown in FIG. 6, power peak voltage decreases as insolation reduces. Thus, if measurement is done at the time of an abrupt drop in insolation, following of operation voltage is not in time, and data corresponding to operation at a voltage larger than the power peak is more likely to be obtained.

FIG. 20 is an example of power generation data in increments of one second with an abrupt drop in insolation. Since it is not practical in terms of data volume to collect data in the remote monitoring server at this time interval beforehand, most of such data is typically abandoned. The sum I=I1+I2+I3+I4 is also indicated in this example for reference.

Figure 21:
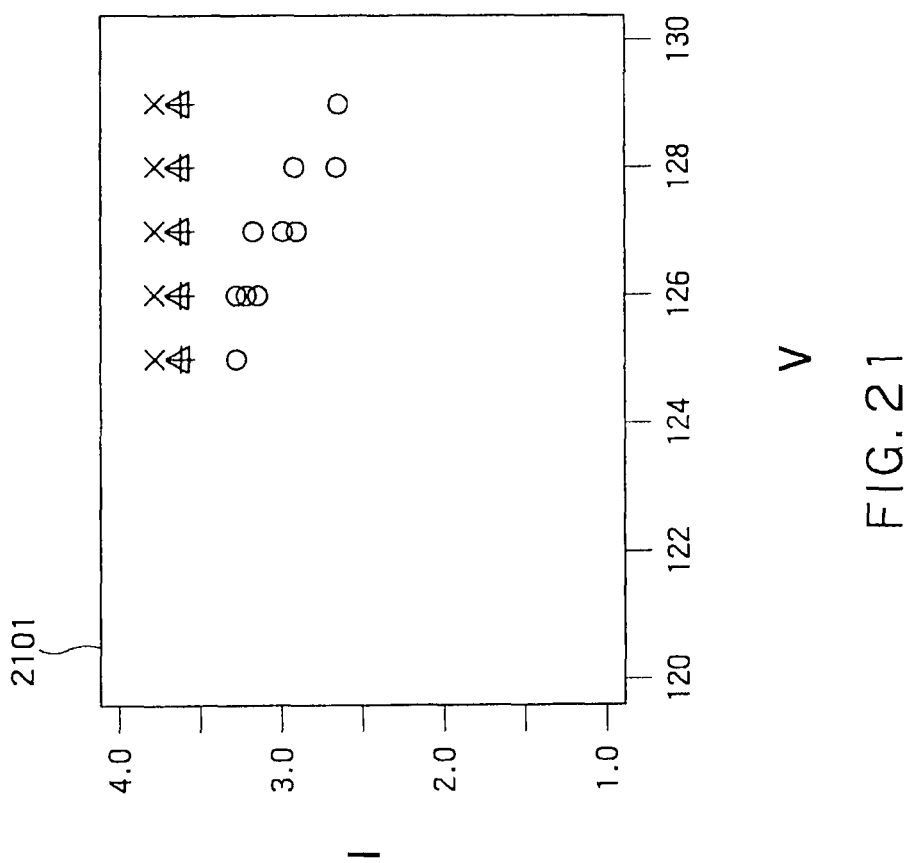
FIG. 21 shows plotting of data of FIG. 20.
Figure 22:
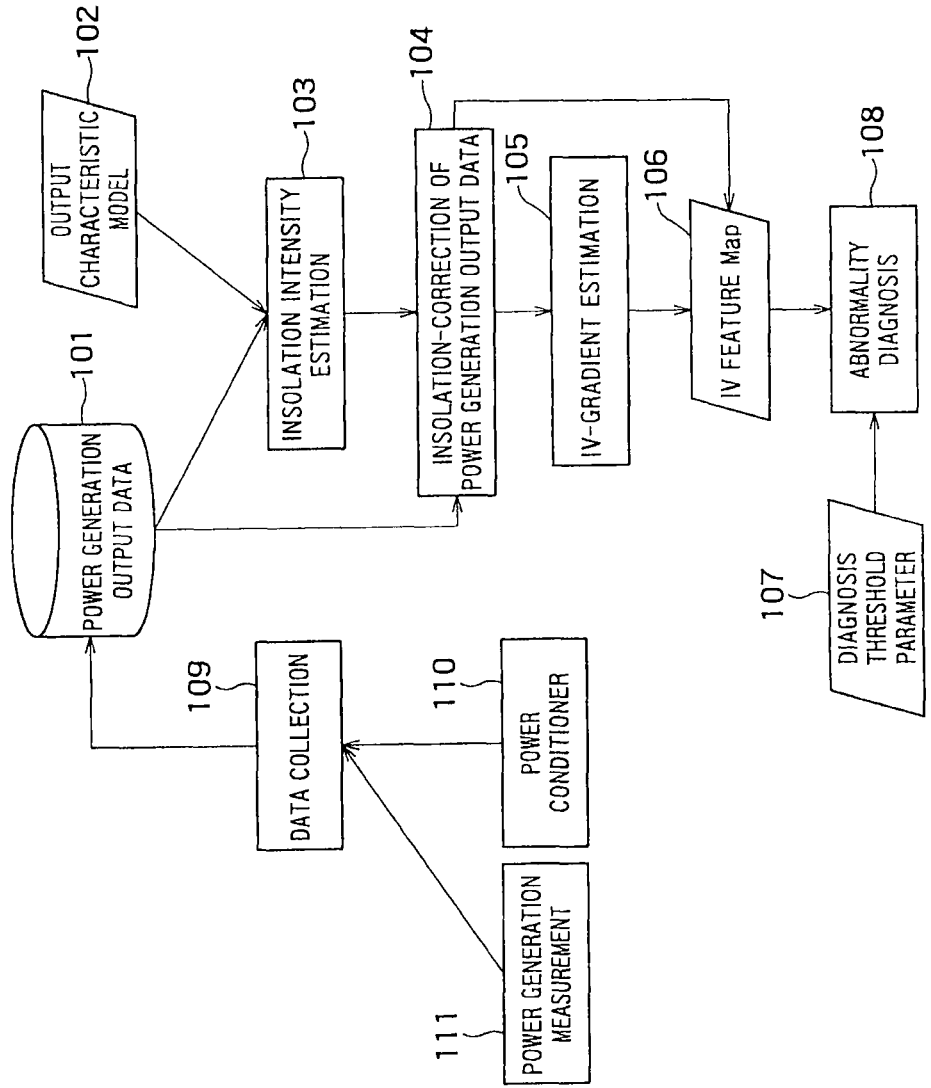
FIG. 22 shows an alternative embodiment of the abnormality diagnosis device.

FIG. 21 is a plot of data 2001 of FIG. 20, showing increased linearity of gradient. Thus, consider an embodiment of the abnormality diagnosis device shown in the block diagram of FIG. 22. In FIG. 22, the data collecting device 109 determines sampling timing using data collected at a short time interval maintained by the power conditioner 110, reads sensor values on the power generation measuring device 111 and stores them in the power output data 101.

Figure 23:
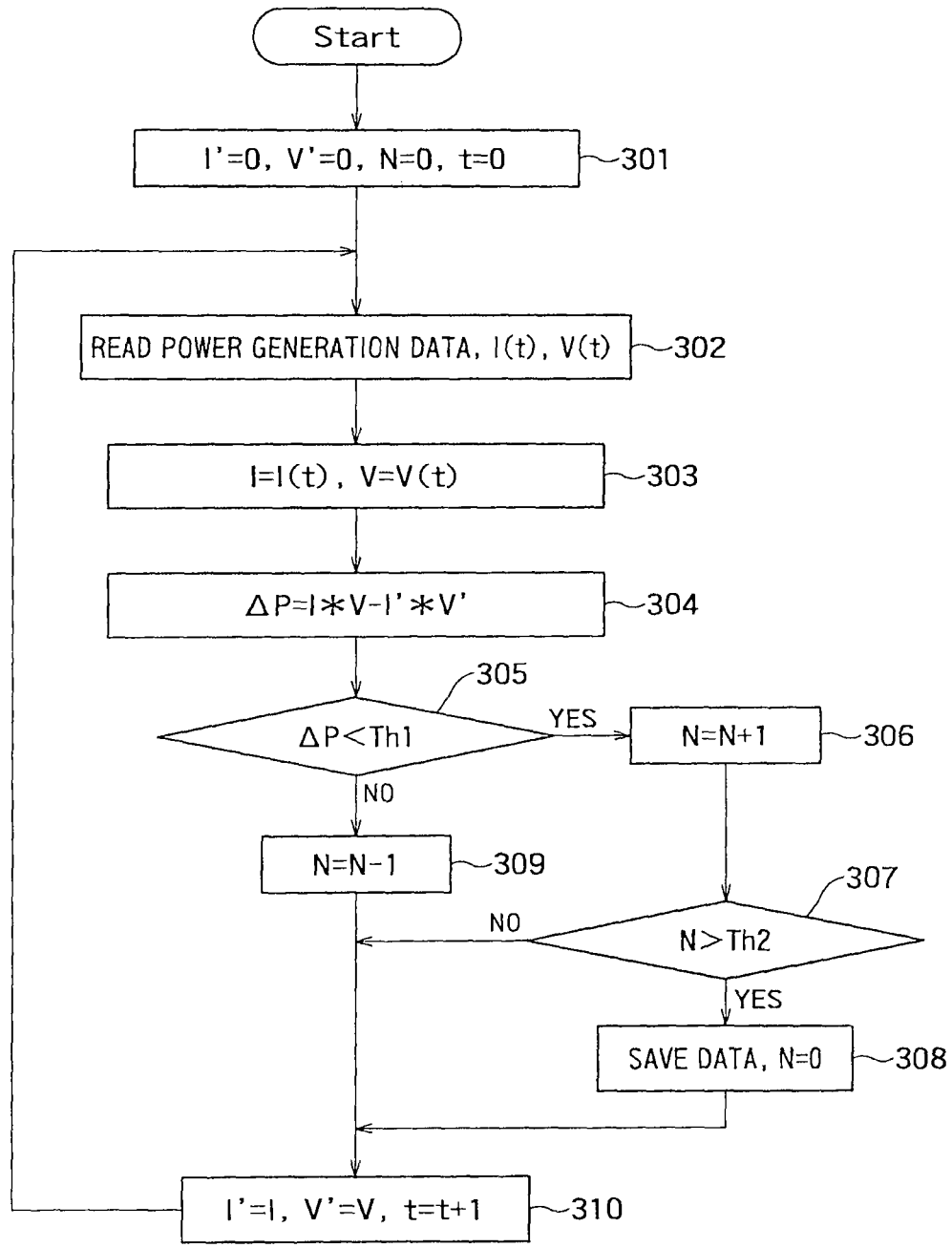
FIG. 23 is a flow diagram of a sampling timing determination process.

FIG. 23 shows a flow diagram of determining sampling timing.

After initialization of variables (301), power generation data at time t, I(t), and V(t) (a value measured by the power conditioner) are loaded (302), and power generation P=I*V at time t is calculated (303).

Then, ΔP, which is the difference from power generation at the immediately previous time, P'=I'*V', is calculated (304), and whether ΔP is smaller than Th1 is determined (305). If ΔP is smaller than Th1, counter N is incremented by one (306), otherwise, decremented by one (309).

After Step 306, it is determined whether N is now larger than Th2 (307). If so, it is determined that the time is suitable for measurement and data measured at that time (power generation output data from the measuring device) is saved (308). At this point, N is initialized to 0. After Step 308, "I" is substituted into I', "V" is substituted into V', and "t" is incremented by one (310), after which the flow returns to Step 302.

The flow returns to Step 302 via Step 310 if it is determined that N is equal to or smaller than Th2 at Step 307 or after Step 309.

FIG. 24 shows an example of data collection timing control with Th1=0 and Th2=5, where data is saved at 8:54:29 at which N has become >5. To be specific, as shown in FIG. 25, while data is accumulated at intervals of one minute (the measuring device measures at intervals of one second and records data for every minute), one record of data is added at 8:54:29 through the timing control of FIG. 24. The voltage at this time is 128 V, meaning that an instance of a value larger than the power peak is obtained. Although it is possible to add data for times before 8:54:29, it requires data be accumulated in the memory of the measuring device.

Although the above example interprets a continuous drop in power generation as an abrupt decrease in insolation and adds a record, it is also possible to estimate insolation intensity and add a record when the estimated insolation has continuously decreased. However, estimation of insolation intensity is expensive to calculate, whereas calculation of power generation requires only calculation of V(t)*I(t) and the PCS has a function to measure V(t) and I(t) for the purpose of using in control. Hence, use of power generation enables processing with simpler and less expensive calculation.

Although the above-described embodiment uses PV strings as subsystems of a photovoltaic power generation system, when current and voltage are obtained only in units of parallel connection of strings, for example, abnormality diagnosis can be performed in those units. In that case, standard IV characteristics are calculated for the entirety of multiple strings. It is required, however, for the system to have knowledge of the level of serialization and parallelism of connection in advance. Also, although multiple power generation modules are connected in series in the embodiment, parallel connection is also possible as a subject of an embodiment.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. An abnormality diagnosis device for a photovoltaic power generation system which controls power generation using a plurality of subsystems each including a plurality of power generation modules being interconnected, comprising:

a power output data storage configured to store power generation output data representing a current and a voltage of electrical power generated by each of the subsystems according to sampling time;

an output data insolation-correcting unit configured to correct, for each of the subsystems, at least the current out of the current and the voltage in the power generation output data to a current corresponding to a standard insolation condition using insolation intensity data to generate insolation-corrected power generation data including a corrected current and either one of a corrected voltage or the voltage in the power generation output data;

a gradient estimating unit configured to produce, for each of the subsystems, an approximation graph of the insolation-corrected power generation data and calculate a gradient of the approximation graph;

an abnormality diagnosing unit configured to determine a subsystem for which the gradient satisfies a first threshold to be a subsystem including an abnormal module; and a feature calculating unit configured to calculate a feature which is different from the gradient based on the insolation-corrected power generation data for each of the subsystems, wherein the abnormality diagnosing unit determines a subsystem for which the gradient satisfies the first threshold or the feature satisfies a second threshold to be the subsystem including the abnormal module.

2. The device according to claim 1, wherein the feature calculating unit derives a representative current of the subsystems at each sampling time, and calculates a feature of each of the subsystems based on the representative current at each sampling time and the current of each of the subsystem.

3. The device according to claim 2, wherein the representative current is a maximum or average of currents generated by the subsystems, and the feature is a ratio of the difference between the representative current and the current of the subsystem to the representative current.

4. The device according to claim 1, wherein the power output data storage stores the power generation output data corresponding to each of a plurality of periods according to the sampling time, the gradient estimating unit estimates the gradient for each of the subsystems in each of the plurality of periods, the feature calculating unit calculates the feature for each of the subsystems in each of the plurality of periods, and the abnormality diagnosing unit determines a subsystem for which a probability that the gradient satisfies the first threshold and the feature satisfies the second threshold is larger than a threshold parameter to be the subsystem including the abnormal module.

5. The device according to claim 1, wherein the gradient estimating unit calculates a straight line by linear approximation and determines a slope of the straight line to be the gradient.

6. An abnormality diagnosis device for a photovoltaic power generation system which controls power generation using a plurality of subsystems each including a plurality of power generation modules being interconnected, comprising:

a power output data storage configured to store power generation output data representing a current and a voltage of electrical power generated by each of the subsystems according to sampling time;

an output data insolation-correcting unit configured to correct, for each of the subsystems, at least the current out of the current and the voltage in the power generation output data to a current corresponding to a standard insolation condition using insolation intensity data to generate insolation-corrected power generation data including a corrected current and either one of a corrected voltage or the voltage in the power generation output data;

a gradient estimating unit configured to produce, for each of the subsystems, an approximation graph of the insolation-corrected power generation data and calculate a gradient of the approximation graph;

an abnormality diagnosing unit configured to determine a subsystem for which the gradient satisfies a first threshold to be a subsystem including an abnormal module; and a unit configured to observe the current and the voltage of the subsystems at intervals of a fixed time, calculates a sum of products of observed currents and voltages among the subsystems, and records power generation output data as when the sum consecutively decreases a predetermined number of times, in a power output data storage.

7. An abnormality diagnosis device for a photovoltaic power generation system which controls power generation using a plurality of subsystems each including a plurality of power generation modules being interconnected, comprising:

a power output data storage configured to store power generation output data representing a current and a voltage of electrical power generated by each of the subsystems according to sampling time;

an output data insolation-correcting unit configured to correct, for each of the subsystems, at least the current out of the current and the voltage in the power generation output data to a current corresponding to a standard insolation condition using insolation intensity data to generate insolation-corrected power generation data including a corrected current and either one of a corrected voltage or the voltage in the power generation output data;

a gradient estimating unit configured to produce, for each of the subsystems, an approximation graph of the insolation-corrected power generation data and calculate a gradient of the approximation graph;

an abnormality diagnosing unit configured to determine a subsystem for which the gradient satisfies a first threshold to be a subsystem including an abnormal module; and an insolation intensity estimating unit configured to estimate an insolation intensity for each of the subsystems based on the power generation output data using an output characteristic model for each of the subsystems that defines a relationship between a current and a voltage that can be generated with the standard insolation intensity, and determines a representative value of insolation intensities estimated for the subsystems as the insolation intensity data.

8. The device according to claim 7, wherein the output characteristic model for the subsystem is obtained by combining output characteristic models for the modules included in the subsystem.

9. An abnormality diagnosis device for a photovoltaic power generation system which controls power generation using a plurality of subsystems each including a plurality of power generation modules being interconnected, comprising:

a power output data storage configured to store power generation output data representing a current and a voltage of electrical power generated by each of the subsystems according to sampling time;

an output data insolation-correcting unit configured to correct, for each of the subsystems, at least the current out of the current and the voltage in the power generation output data to a current corresponding to a standard insolation condition using insolation intensity data to generate insolation-corrected power generation data including a corrected current and either one of a corrected voltage or the voltage in the power generation output data;

a gradient estimating unit configured to produce, for each of the subsystems, an approximation graph of the insolation-corrected power generation data and calculate a gradient of the approximation graph; and an abnormality diagnosing unit configured to determine a subsystem for which the gradient satisfies a first threshold to be a subsystem including an abnormal module;

wherein the gradient estimating unit calculates the gradient using a part of the insolation-corrected power generation data in which the voltage is equal to or greater than a threshold, the threshold being a value between the minimum and maximum of the voltage in the insolation-corrected power generation data.

\* \* \* \* \*